United States Patent Office 2,928,878
Patented Mar. 15, 1960

2,928,878
DEALKYLATION PROCEDURE FOR ALKOXY BENZOPHENONES

John F. Hosler, Bound Brook, N.J., and Stanley J. Storfer, Brooklyn, N.Y., assignors to American Cyanamid Company, New York, N.Y., a corporation of Maine No Drawing. Application July 25, 1958
Serial No. 750,866

11 Claims. (Cl. 260—591)

This invention relates to a process for dealkylating o-alkoxybenzophenones. More specifically, it relates to a process for the dealkylation of the o-alkoxy groups in o-alkoxybenzophenones having at least one p-alkoxy group, which comprises heating the said o-alkoxybenzophenone to a temperature ranging from 25° C. to 180° C. in an inert solvent for Friedel-Crafts reactions, in the presence of at least 0.025 mole but at most substantially less than 1.0 mole of an aluminum halide per equivalent of o-alkoxy groups to be dealkylated, and in the presence of at least one mole of hydrogen bromide per equivalent of o-alkoxy groups.

The cleavage of phenol ethers by the use of aluminum halides is a well known reaction. It proceeds through the steps of the formation of an additional compound which decomposes into an alkyl halide and aluminum chlorophenolate. The free phenol can be obtained from the latter by decomposition with water. Such a reaction requires a mole-for-mole usage of aluminum chloride. In this, as in most of the other common reactions of the so-called Friedel-Crafts type, the aluminum chloride is not a true catalyst, but a reactant which must be used in molar quantities.

We have found that it is possible, contrary to the theoretical basis of the Friedel-Crafts reaction, to dealkylate certain o-alkoxybenzophenones using quantities of aluminum halides considerably less than the molar quantities called for by theory. We have found that this can be carried out by heating the o-alkoxybenzophenone to from 25° C. to 180° C. in an inert solvent in the presence of substantially less than molar quantities of aluminum halide per equivalent of o-alkoxy group and also, in the presence of at least one mole of hydrogen bromide per equivalent of o-alkoxy group. We have further found that, very surprisingly, this procedure gives better yields and a much cleaner product.

In the process of our invention the o-alkoxybenzophenone is converted to an o-hydroxybenzophenone by stirring and heating in an inert solvent in the presence of catalytic amounts of an aluminum halide while passing in or maintaining an atmosphere of hydrogen bromide. The reaction is of special importance because of the recent development of ultraviolet absorbers which protect various materials from deterioration because of the action of ultraviolet light. These ultraviolet absorbers, which act by preferential absorption of an ultraviolet light incident upon the material, are primarily o-hydroxybenzophenones which have p-alkoxy groups. In the usual methods of synthesis, the benzophenone structure is synthesized with all the hydroxyls alkylated, and the problem arises to dealkylate the o-hydroxyls selectively. The process of our invention represents a distinct improvement in this dealkylation of the o-alkoxy groups in that cleaner products are obtained by a more simple manipulation and by the use of considerably less aluminum halide, which heretofore has been used in molar quantities or greater.

The benzophenones which may be dealkylated in the process of our invention include any benzophenone having both an ortho- and a para-alkoxy group. The process of our invention effects very cleanly the selective dealkylation of the o-alkoxy groups. Among the benzophenones which may be prepared by the process of our invention, one may find the following:

2-hydroxy-4-methoxybenzophenone
2-hydroxy-4-ethoxybenzophenone
2-hydroxy-4-butoxybenzophenone
2-hydroxy-4-methoxy-4'-methylbenzophenone
2-hydroxy-4-methoxy-4'-ethylbenzophenone
2-hydroxy-4-methoxy-4'-propylbenzophenone
2-hydroxy-4-methoxy-4'-chlorobenzophenone
2-hydroxy-4-methoxy-4'-bromobenzophenone
2-hydroxy-4,4'-dimethoxybenzophenone
2-hydroxy-4,4'-dimethoxy-3-methylbenzophenone
2-hydroxy-4-ethoxy-4'-propylbenzophenone
2-hydroxy-4-ethoxy-4'-ethylbenzophenone
2-hydroxy-4-ethoxy-4'-methoxybenzophenone
2-hydroxy-4-ethoxy-4'-chlorobenzophenone
2,2'-dihydroxy-4,4'-dimethoxybenzophenone
2,2'-dihydroxy-4,4'-diethoxybenzophenone
2,2'-dihydroxy-4,4'-dibutoxybenzophenone
2,2'-dihydroxy-4-ethoxy-4'-methoxybenzophenone
2,2'-dihydroxy-4-butoxy-4'-methoxybenzophenone
2,2'-dihydroxy-4,4'-dilauroxybenzophenone
2,2'-dihydroxy-4-methoxybenzophenone
2,2'-dihydroxy-4-ethoxybenzophenone
2,2'-dihydroxy-4-propoxybenzophenone
2,2'-dihydroxy-4-lauroxybenzophenone
2-hydroxy-4'-methoxybenzophenone Such ultraviolet absorbers are described in various patents and applications. Among these are U.S. 2,777,828; U.S. 2,693,492; U.S. 2,7773,903, and the applications of Hardy, Forster, and Coleman, Serial No. 592,509, filed June 20, 1956, now U.S. Patent No. 2,853,521, as well as the application of Coleman Serial No. 716,889, filed February 24, 1958, now abandoned.

The solvents which may be used in the process of our invention include any solvent for a Friedel-Crafts reaction which is inert to the reactants. Examples are the various aromatic hydrocarbons, such as benzene; toluene; xylene; the chlorinated hydrocarbons such as monochlorobenzene, the dichlorobenzenes and trichlorobenzene, mononitrobenzene; chlorinated aliphatic solvents such as ethylene dichloride, acetylene tetrachloride, and the like.

In the practice of our invention the reaction is carried out at any temperature between ambient and 180° C. Preferably, it is carried out in the range of 80° to 100° C. At temperatures close to ambient the reaction takes a long time to be completed, and at temperatures toward the upper range there is increasing danger of dealkylating the p-alkoxy groups present. Consequently, 80 to 100° C. is the preferred range.

The aluminum halide used may be aluminum chloride or aluminum bromide, each operating equally well in our reaction. The hydrogen bromide must be used as the hydrogen halide, since hydrogen chloride is not very effective.

The benzophenones used as the starting materials of our invention include such compounds as:

2,4-dimethoxybenzophenone
2,2',4-trimethoxybenzophenone
2,4-dimethoxy-2'-hydroxybenzophenone
2,2',4,4'-tetramethoxybenzophenone
2,4,4'-trimethoxy-2'-hydroxybenzophenone
2-hydroxy-4-ethoxy-2',4'-dimethoxybenzophenone
2-hydroxy-2'-methoxy-4,4'-diethoxybenzophenone 2-hydroxy-2',4,4'-triethoxybenzophenone
2,2'-dimethoxy-4,4'-diethoxybenzophenone
2,2',4,4'-tetraethoxybenzophenone
2-hydroxy-2',4'-diethoxybenzophenone
2-methoxy-4-butoxybenzophenone
2,4-dibutoxybenzophenone
2,4-dimethoxy-4'-chlorobenzophenone
2,4-dimethoxy-4'-ethylbenzophenone
2,4,4'-trimethoxy-3-methylbenzophenone
2,4-diethoxy-4'-propylbenzophenone
2,4'-dimethoxy-4-ethoxybenzophenone
2,4'-dimethoxybenzophenone,
And the like.

These compounds may be prepared in any practical manner. Thus, they can be prepared by the reaction of phosgene with an alkoxybenzene, a process which prepares the symmetrical tetraalkoxybenzophenones, or they may be prepared by condensation of a suitably substituted or unsubstituted benzoyl chloride with a suitably substituted alkoxybenzene either in the presence of aluminum chloride or in the presence of other condensing agents. The process of our invention is of especial importance when condensing agents other than aluminum chloride, such as polyphosphoric acid are used to run this condensation, since when aluminum chloride is used the dealkylation can be carried out with the aluminum chloride in situ.

In the process of our invention the o-alkoxybenzophenone is dissolved in the solvent and a catalytic amount of the aluminum halide is added. The mixture is then heated and hydrogen bromide is added. If the reaction is run in an autoclave a minimum amount of hydrogen bromide can be used. As little as 25% excess over the stoichiometrical amount will give excellent results. If the reaction is being run in an open vessel, the hydrogen bromide is merely passed through on a continuous basis and higher usages are involved.

It is an advantage of our invention in that it uses much smaller amounts of the aluminum halide and consequently, avoids the thick viscous mass which the aluminum halide addition product forms. It is a further advantage of our invention that the process gives better yields of purer products than the dealkylation with an aluminum halide alone in molar quantities. This is a most surprising result. Not only is the usage of the aluminum halide greatly reduced below that which theory calls for, but the net result is that a purer product is obtained more easily and in better yield. This could not be predicted from the knowledge of Friedel-Crafts reactions in the art.

The o-hydroxybenzophenones produced by the process of our invention are useful as ultraviolet absorbers in the many ways in which these compounds are used in commerce.

Our invention can be further illustrated by the following examples in which parts are by weight unless otherwise specified.

*Example 1*

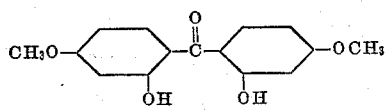

A mixture of 1 mole part of 2-hydroxy-2',4,4'-trimethoxybenzophenone, 0.1 mole part of aluminum chloride and 1000 parts of monochlorobenzene is stirred and heated to 90–95° C., while hydrogen bromide is passed through until the reaction is substantially complete. The product 2,2'-dihydroxy-4,4'-dimethoxybenzophenone is isolated by steam distillation of the solvent. Recrystallization of the residue from alcohol gives a good yield of pure product.

If instead of 0.1 mole quantity of aluminum chloride, the quantity of aluminum chloride used is 1 mole per mole of the starting material, the same product is obtained but in markedly lower yield. The same result is obtained when this reaction is run using ethylene dichloride or nitrobenzene as the solvent.

*Example 2*

The procedure of Example 1 is followed using as the starting material an equivalent quantity of 2,2',4,4'-tetramethoxybenzophenone. The product which is obtained is that of Example 1.

*Example 3*

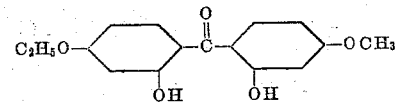

The procedure of Example 1 is followed using an equivalent quantity of 2-hydroxy-4-ethoxy-2',4'-dimethoxybenzophenone to give the above product 2,2'-dihydroxy-4-methoxy-4'-ethoxybenzophenone in good yield. When the procedure is repeated using 1 mole of aluminum chloride instead of 0.1 mole, a markedly poorer yield is obtained of a markedly inferior product. The same product is obtained when an equivalent quantity of 2,4,2'-trimethoxy-4'-ethoxybenzophenone is used as the starting material.

*Example 4*

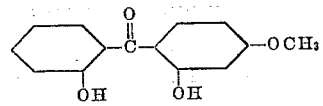

The procedure of Example 1 is followed using an equivalent quantity of 2-hydroxy-2',4'-dimethoxybenzophenone as the starting material to yield an excellent yield of the above product.

*Example 5*

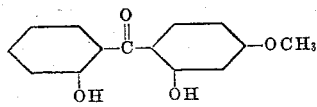

The procedure of Example 1 is followed using as the starting material an equivalent quantity of 2,4-dimethoxybenzophenone. Similarly, if equivalent quantities of 4'-chloro-2,4-dimethoxybenzophenone, 4'-butyl-2',4'-dimethoxybenzophenone, 2',4'-dichloro-2,4-dimethoxybenzophenone, 2-hydroxy-4-butoxy-2',4'-dimethoxybenzophenone or 4'-ethoxy-2,4-dimethoxybenzophenone are used, the correspondingly substituted product of the above formula is obtained in good yields.

*Example 6*

The procedure of Example 1 is followed using aluminum bromide in place of the aluminum chloride in equivalent amounts. A similar result is obtained.

*Example 7*

The procedure of Example 1 is followed using 0.6 mole parts of aluminum chloride in place of the 0.1 mole part. The product is obtained in almost as good yield as that obtained in Example 1, and still with a marked improvement over the yield obtained when a 1 mole quantity of aluminum chloride is used.

We claim:

1. A process of dealkylating o-alkoxy groups in o-alkoxybenzophenones having at least one p-alkoxy substituent which comprises heating the said benzophenones to temperatures from ambient to 180° C. in a solvent inert to Friedel-Crafts catalysts in the presence of at least 0.025 mole but at most 0.6 mole of an aluminum halide per equivalent of o-alkoxy groups to be dealkylated and in the presence of at least one mole of hydrogen bromide per said equivalent of said o-alkoxy group.

2. The process of claim 1 in which the aluminum halide is aluminum chloride.

3. The process of claim 2 in which the temperature range is 80–100° C.

4. The process of claim 3 in which the aluminum halide usage is less than .5 mole per said equivalent of o-alkoxy group.

5. The process of claim 4 in which the starting material is 2-hydroxy-2′,4′-dimethoxybenzophenone.

6. The process of claim 4 in which the starting material is 2-hydroxy-4-ethoxy-2′,4′-dimethoxybenzophenone.

7. The process of claim 4 in which the starting material is 2,2′,4,4′-tetramethoxybenzophenone.

8. The process of claim 4 in which the starting material is 2,4-dimethoxybenzophenone.

9. The process of claim 4 in which the starting material is 2,4-dimethoxy-4′-chlorobenzophenone.

10. The process of claim 4 in which the starting material is 2,4-dimethoxy-2′,4′-dichlorobenzophenone.

11. The process of claim 4 in which the starting material is 2-hydroxy-4-butoxy - 2′,4′ - dimethoxybenzophenone.

References Cited in the file of this patent

UNITED STATES PATENTS 2,773,903  Hardy et al. _____ Dec. 11, 1956

FOREIGN PATENTS 792,653  Great Britain _____ Apr. 2, 1958

OTHER REFERENCES

Thomas: Anhydrous Aluminum Chloride in Org. Chem., pp. 727–9 (1941).

Wagner et al.: Synthetic Org. Chem., pp. 171–2 (1953).